(12) United States Patent
Ito

(10) Patent No.: US 10,766,589 B1
(45) Date of Patent: Sep. 8, 2020

(54) SYSTEM FOR AND METHOD OF CONTROLLING WATERCRAFT

(71) Applicant: YAMAHA HATSUDOKI KABUSHIKI KAISHA, Iwata-shi, Shizuoka (JP)

(72) Inventor: Makoto Ito, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 153 days.

(21) Appl. No.: 16/219,988

(22) Filed: Dec. 14, 2018

Related U.S. Application Data

(60) Provisional application No. 62/607,425, filed on Dec. 19, 2017.

(51) Int. Cl.
| | |
|---|---|
| *B63H 20/12* | (2006.01) |
| *B63H 20/00* | (2006.01) |
| *G05D 1/02* | (2020.01) |
| *B63H 25/24* | (2006.01) |
| *B63H 21/21* | (2006.01) |

(52) U.S. Cl.
CPC ........... *B63H 20/12* (2013.01); *B63H 21/265* (2013.01); *B63H 25/24* (2013.01); *G05D 1/0206* (2013.01); *B63H 2020/003* (2013.01); *B63H 2021/216* (2013.01)

(58) Field of Classification Search
CPC ...... B63H 20/12; B63H 21/265; B63H 25/24; B63H 2020/003; G05D 1/0206
See application file for complete search history.

(56) References Cited

U.S. PATENT DOCUMENTS

| | | | |
|---|---|---|---|
| 9,545,987 B1* | 1/2017 | Przybyl | B63H 23/28 |
| 2011/0166724 A1* | 7/2011 | Hiramatsu | B63H 25/42 |
| | | | 701/21 |
| 2014/0046515 A1* | 2/2014 | Mizutani | B63H 21/213 |
| | | | 701/21 |
| 2015/0246714 A1 | 9/2015 | Morikami et al. | |
| 2018/0057132 A1* | 3/2018 | Ward | B63H 21/21 |

FOREIGN PATENT DOCUMENTS

JP 2014-76761 A 5/2014

* cited by examiner

*Primary Examiner* — Michael J Zanelli
(74) *Attorney, Agent, or Firm* — Keating and Bennett, LLP

(57) ABSTRACT

A controller receives a bow turning signal to turn a bow of a watercraft and a propulsion signal to move the watercraft forward or rearward. The controller controls left and right outboard motors under a first control when receiving the propulsion signal after receiving the bow turning signal in a composite in which the controller receives both the bow turning signal and the propulsion signal. The controller controls the left and right outboard motors and a steering actuator under a second control different from the first control when receiving the bow turning signal after receiving the propulsion signal in the composite operation.

16 Claims, 17 Drawing Sheets

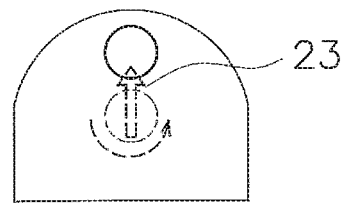 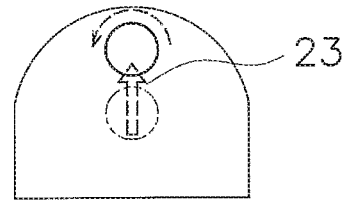
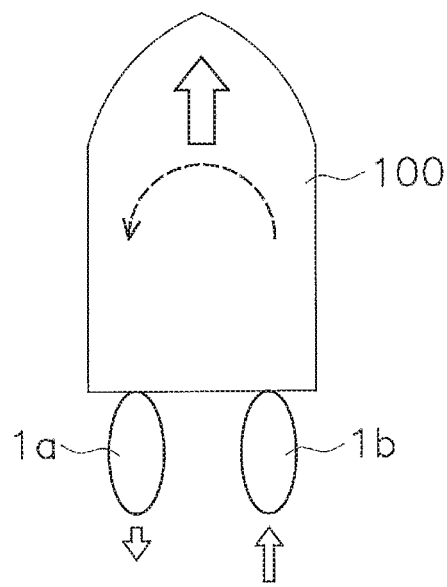 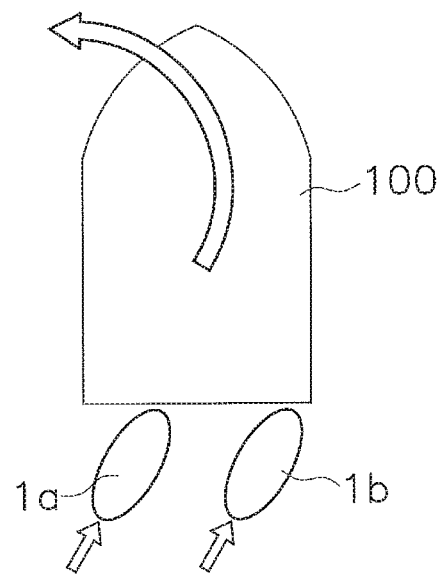
FIG. 11A    FIG. 11B

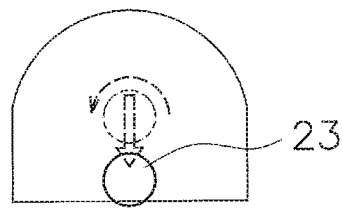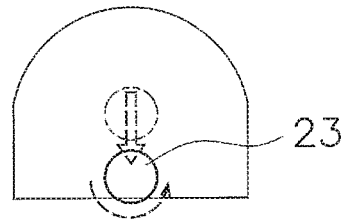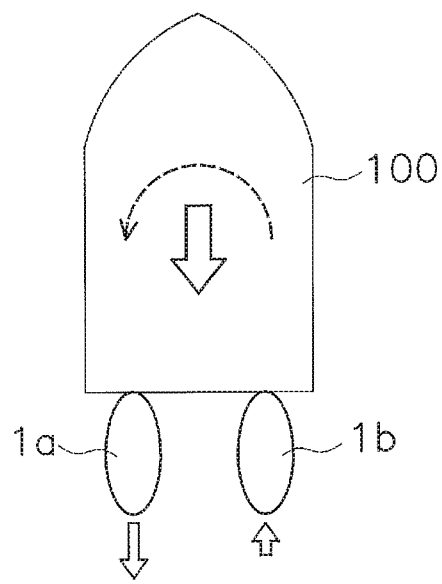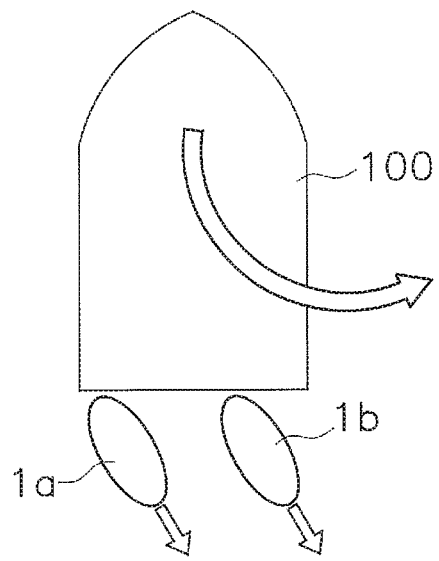
FIG. 12A  FIG. 12B

SYSTEM FOR AND METHOD OF CONTROLLING WATERCRAFT

CROSS REFERENCE TO RELATED APPLICATIONS

This application claims the benefit of priority to U.S. Patent Application No. 62/607,425 filed on Dec. 19, 2017. The entire contents of this application are hereby incorporated herein by reference.

BACKGROUND OF THE INVENTION

1. Field of the Invention

The present invention relates to a system for and a method of controlling a watercraft.

2. Description of the Related Art

A type of control method that controls the magnitude and direction of a thrust generated by each of a plurality of outboard motors so as to turn the bow of a watercraft has been known. For example, a control device for outboard motors described in Japan Laid-open Patent Application Publication No. JP2014-76761A controls right and left outboard motors in accordance with a twist operation of a joystick. Specifically, when the joystick is twisted rightward, the control device causes the outboard motor disposed on the port side to generate a thrust for forward movement, and simultaneously, causes the outboard motor disposed on the starboard side to generate a thrust for rearward movement. Thus, the watercraft turns the bow rightward due to difference in thrust between the right and left outboard motors.

In some situations, an operator wants to move the watercraft forward (or rearward) while turning the bow of the watercraft. In such a situation, the aforementioned control device requires the operator to be skilled in performing bow turning and forward (or rearward) movement simultaneously.

When the watercraft is moved forward (or rearward) while bow turning thereof is ongoing, it can be also assumed to cause each of the right and left outboard motors to generate a thrust for forward (or rearward) movement, and simultaneously change the rudder angle thereof. Accordingly, the watercraft can be turned rightward and leftward while being moved forward (or rearward).

However, in some situations, such as in a place in the vicinity of a wharf, for minutely adjusting the position or direction of the watercraft, the operator wants to move the watercraft forward (or rearward) while bow turning of the watercraft is ongoing. In the situations, when the rudder angles are changed as described above, this results in delay in motion of actuators for changing the rudder angles. Therefore, the operator is required to be skilled in performing such an operation as adjustment in position or direction of the watercraft.

SUMMARY OF THE INVENTION

Preferred embodiments of the present invention make an operation of a watercraft easy in accordance with a state of the watercraft when the watercraft is moved forward or rearward while bow turning thereof is ongoing.

A system according to a first preferred embodiment of the present invention is a system used in controlling a watercraft which includes a left outboard motor, a right outboard motor, a steering actuator, and a controller. The left outboard motor is disposed on a port side of the watercraft. The right outboard motor is disposed on a starboard side of the watercraft. The steering actuator changes rudder angles of the right outboard motor and the left outboard motor. The controller communicates with the right outboard motor and the left outboard motor and the steering actuator.

The controller receives a bow turning signal for turning a bow of the watercraft and a propulsion signal for moving the watercraft forward or rearward. The controller controls the right outboard motor and the left outboard motor under a first control when receiving the propulsion signal after receiving the bow turning signal in a composite operation that the controller receives both the bow turning signal and the propulsion signal. The controller controls the right outboard motor and the left outboard motor and the steering actuator under a second control different from the first control when receiving the bow turning signal after receiving the propulsion signal in the composite operation.

A method according to a second preferred embodiment of the present invention is a method of controlling a watercraft including a left outboard motor, a right outboard motor, and a steering actuator. The left outboard motor is disposed on a port side of the watercraft. The right outboard motor is disposed on a starboard side of the watercraft. The steering actuator changes rudder angles of the right outboard motor and the left outboard motor. The method according to this preferred embodiment includes the following processing.

First processing refers to receiving a bow turning signal turning a bow of the watercraft and a propulsion signal moving the watercraft forward or rearward. Second processing refers to controlling the right outboard motor and the left outboard motor under a first control when the propulsion signal is received after the bow turning signal is received in a composite operation that both the bow turning signal and the propulsion signal are received. Third processing refers to controlling the right outboard motor and the left outboard motor and the steering actuator under a second control different from the first control when the bow turning signal is received after the propulsion signal is received in the composite operation.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 11A and 11B are diagrams showing control of the outboard motors in a third composite operation.

FIGS. 12A and 12B are diagrams showing control of the outboard motors in a fourth composite operation.

DETAILED DESCRIPTION OF THE PREFERRED EMBODIMENTS

Figure 1:
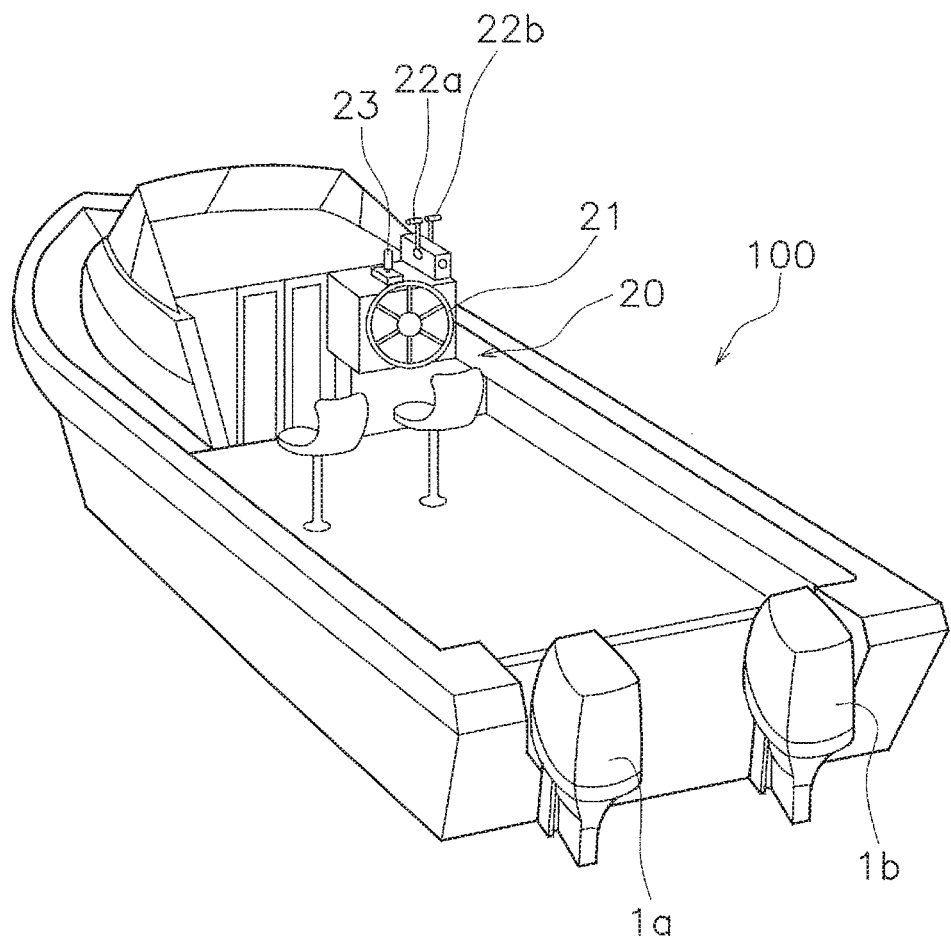
FIG. 1 is a schematic diagram of a watercraft in which a watercraft control system according to a preferred embodiment of the present invention is embedded.

Preferred embodiments of the present invention will be hereinafter explained with reference to the drawings. FIG. 1 is a schematic diagram of a watercraft 100 in which a control system according to a preferred embodiment is embedded. As shown in FIG. 1, the control system includes a plurality of outboard motors 1a and 1b. Specifically, the watercraft 100 includes a left outboard motor 1a and a right outboard motor 1b.

The outboard motors 1a and 1b are preferably attached to the stern of the watercraft 100. The outboard motors 1a and 1b are disposed in alignment in the width direction of the watercraft 100. Specifically, the left outboard motor 1a is preferably disposed on the port side of the watercraft 100 and the right outboard motor 1b is preferably disposed on the starboard side of the watercraft 100. Each of the outboard motors 1a and 1b generates a thrust to propel the watercraft 100.

Figure 2:
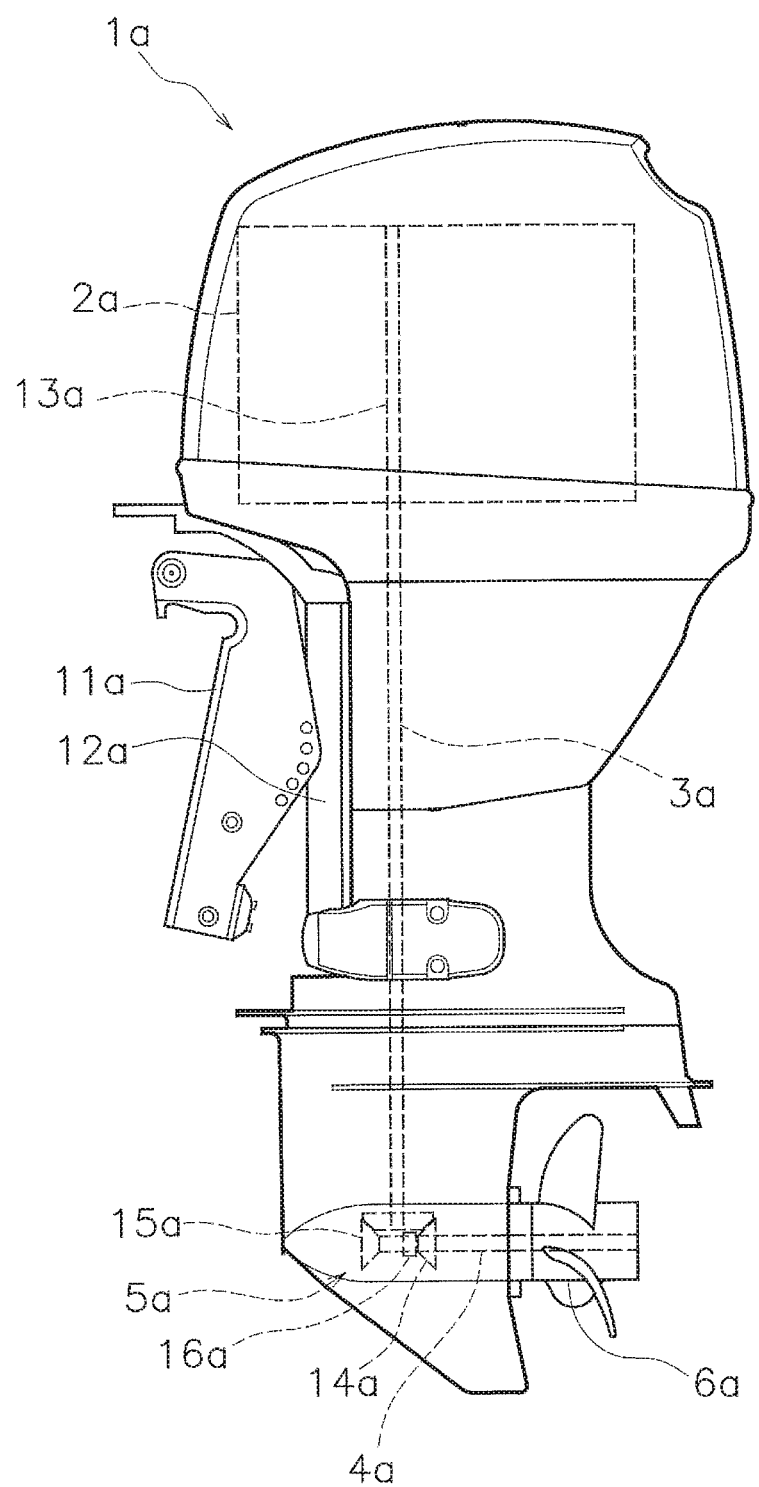
FIG. 2 is a side view of an outboard motor according to a preferred embodiment of the present invention.

FIG. 2 is a side view of the left outboard motor 1a. A structure of the left outboard motor 1a will be hereinafter explained. However, the right outboard motor 1b also preferably has the same or a similar structure to the left outboard motor 1a. The left outboard motor 1a is preferably attached to the watercraft 100 through a bracket 11a. The bracket 11a supports the left outboard motor 1a such that the left outboard motor 1a is rotatable about a steering shaft 12a. The steering shaft 12a extends in the vertical direction.

The left outboard motor 1a preferably includes an engine 2a, a drive shaft 3a, a propeller shaft 4a, and a shift mechanism 5a. The engine 2a generates a thrust to propel the watercraft 100. The engine 2a includes a crankshaft 13a. The crankshaft 13a extends in the vertical direction. The drive shaft 3a is connected to the crankshaft 13a. The drive shaft 3a extends in the vertical direction. The propeller shaft 4a extends in the front-and-back direction. The propeller shaft 4a is connected to the drive shaft 3a through the shift mechanism 5a. A propeller 6a is attached to the propeller shaft 4a.

The shift mechanism 5a preferably includes a forward moving gear 14a, a rearward moving gear 15a, and a clutch 16a. When gear engagement is switched between the gears 14a and 15a by the clutch 16a, the direction of rotation transmitted from the drive shaft 3a to the propeller shaft 4a is reversed. Movement of the watercraft 100 is thus switched between forward movement and rearward movement.

Figure 3:
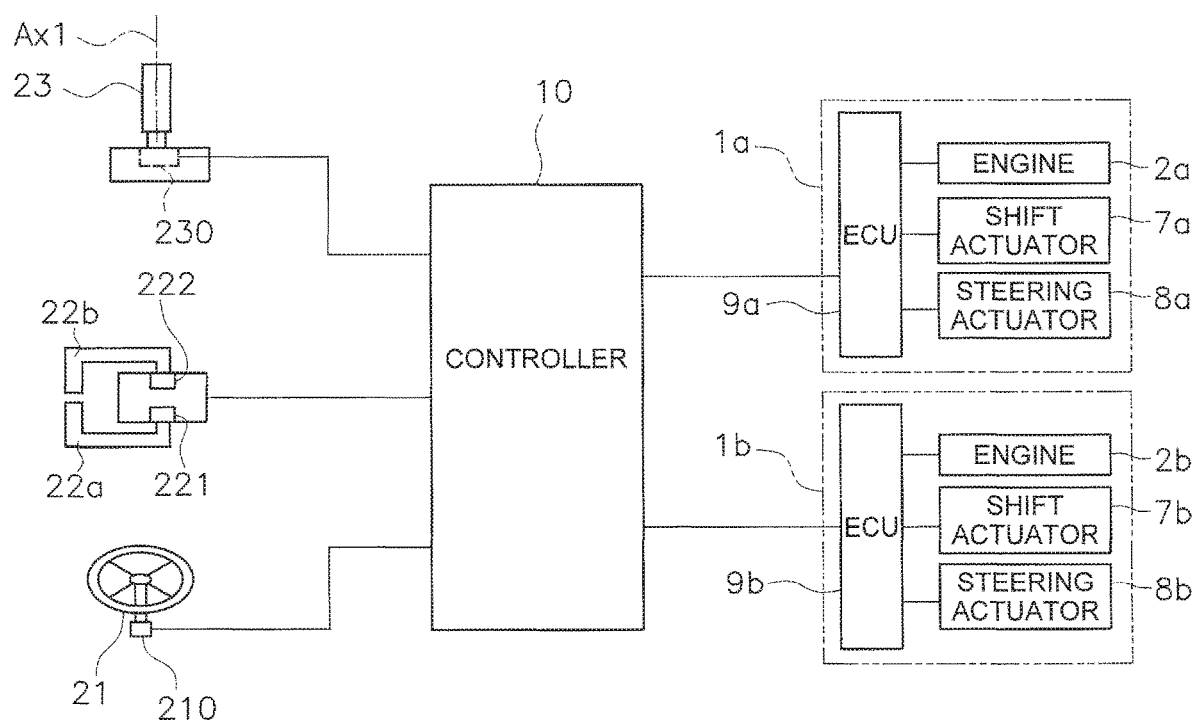
FIG. 3 is a schematic configuration diagram of the watercraft control system.

FIG. 3 is a schematic configuration diagram of a control system of the watercraft 100. As shown in FIG. 3, the left outboard motor 1a back-and-forth direction includes a shift actuator 7a and a steering actuator 8a.

The shift actuator 7a is connected to the clutch 16a of the shift mechanism 5a. The shift actuator 7a actuates the clutch 16a so as to switch gear engagement between the gears 14a and 15a. Movement of the watercraft 100 is thus switched between forward movement and rearward movement. The shift actuator 7a is preferably an electric motor. It should be noted that the shift actuator 7a may alternatively be another type of actuator such as, for example, an electric cylinder, a hydraulic motor, a hydraulic cylinder, etc.

The steering actuator 8a is connected to the left outboard motor 1a. The steering actuator 8a rotates the left outboard motor 1a about the steering shaft 12a. The rudder angle of the left outboard motor 1a is thus changed. The steering actuator 8a is preferably an electric motor. It should be noted that the shift actuator 7a may alternatively be another type of actuator such as, for example, an electric cylinder, a hydraulic motor, a hydraulic cylinder, etc.

The left outboard motor 1a includes an ECU (electric control unit) 9a. The ECU 9a preferably includes a processor such as a CPU and memory such as, for example, a RAM and a ROM. The ECU 9a stores a program and data to control the left outboard motor 1a. The ECU 9a controls actions of the engine 2a, the shift actuator 7a, and the steering actuator 8a.

As shown in FIG. 3, the right outboard motor 1b preferably includes an engine 2b, a shift actuator 7b, a steering actuator 8b, and an ECU 9b. The engine 2b, the shift actuator 7b, the steering actuator 8b, and the ECU 9b in the right outboard motor 1b are preferably configured similarly to the engine 2a, the shift actuator 7a, the steering actuator 8a, and the ECU 9a in the left outboard motor 1a, respectively.

The control system includes a steering wheel 21, throttle levers 22a and 22b, and a joystick 23. As shown in FIG. 1, the steering wheel 21, the throttle levers 22a and 22b, and the joystick 23 are disposed in a cockpit 20 of the watercraft 100.

The steering wheel 21 is a device that allows an operator to operate the turning direction of the watercraft 100. The steering wheel 21 includes a sensor 210. The sensor 210 outputs a signal indicating the operating direction and the operating amount of the steering wheel 21.

The throttle levers 22a and 22b include a first lever 22a and a second lever 22b. The first lever 22a is a device that allows the operator to regulate the magnitude of a thrust generated by the left outboard motor 1a. Additionally, the first lever 22a is a device that allows the operator to switch the direction of the thrust generated by the left outboard motor 1a between forward and rearward directions. The first lever 22a is disposed to be operable from a neutral position to a forwardly moving directional side and a rearward moving directional side. The first lever 22a includes a sensor 221. The sensor 221 outputs a signal indicating the operating direction and the operating amount of the first lever 22a.

The second lever 22b is a device that allows the operator to regulate the magnitude of a thrust generated by the right outboard motor 1b. Additionally, the second lever 22b is a device that allows the operator to switch the direction of the thrust generated by the right outboard motor 1b between forward and rearward directions. The second lever 22b is disposed to be operable from a neutral position to a forwardly moving directional side and a rearward moving directional side. The second lever 22b includes a sensor 222. The sensor 222 outputs a signal indicating the operating direction and the operating amount of the second lever 22b.

The joystick 23 is a device that allows the operator to operate the movement of the watercraft 100 in each of the moving directions of front, rear, right and left. Additionally, the joystick 23 is a device that allows the operator to operate the bow turning motion of the watercraft 100. The joystick 23 is tiltable in at least four directions including front, rear, right and left. It should be noted that four or more directions, and furthermore, all directions may be instructed by the joystick 23.

Moreover, the joystick 23 is preferably disposed to be turnable about a rotational axis Ax1. The joystick 23 includes a sensor 230. The sensor 230 outputs a propulsion signal indicating the tilt direction and the tilt amount of the joystick 23. Additionally, the sensor 230 outputs a bow turning signal indicating the twist direction and the twist amount of the joystick 23.

The control system includes a controller 10. The controller 10 preferably includes a processor such as a CPU and memory such as a RAM and an ROM, for example. The controller 10 stores a program and data used to control the right and left outboard motors 1b and 1a. The controller 10 is connected to the ECUs 9a and 9b through wired or wireless communication. The controller 10 is connected to the steering wheel 21, the throttle levers 22a and 22b, and the joystick 23 through wired or wireless communication.

The controller 10 receives signals from the sensors 210, 221, 222, and 230. The controller 10 outputs command signals to the ECUs 9a and 9b based on the signals from the sensors 210, 221, 222 and 230.

For example, the controller 10 outputs a command signal to the shift actuator 7a in accordance with the operating direction of the first lever 22a. Movement of the left outboard motor 1a is thus switched between forward movement and rearward movement. The controller 10 outputs a command signal to the engine 2a in accordance with the operating amount of the first lever 22a. The engine rotational speed of the left outboard motor 1a is thus controlled.

The controller 10 outputs a command signal to the shift actuator 7b in accordance with the operating direction of the second lever 22b. Movement of the right outboard motor 1b is thus switched between forward movement and rearward movement. The controller 10 outputs a command signal to the engine 2b in accordance with the operating amount of the second lever 22b. The engine rotational speed of the right outboard motor 1b is thus controlled.

The controller 10 outputs command signals to the steering actuators 8a and 8b in accordance with the operating direction and the operating amount of the steering wheel 21. When the steering wheel 21 is operated leftward from the neutral position, the controller 10 controls the steering actuators 8b and 8a such that the right and left outboard motors 1b and 1a are rotated rightward. The watercraft 100 thus turns leftward. When the steering wheel 21 is operated rightward from the neutral position, the controller 10 controls the steering actuators 8b and 8a such that the right and left outboard motors 1b and 1a are rotated leftward. The watercraft 100 thus turns rightward. Additionally, the controller 10 controls the rudder angles of the right and left outboard motors 1b and 1a in accordance with the operating amount of the steering wheel 21.

The controller 10 outputs command signals to the engines 2a and 2b, the shift actuators 7a and 7b, and the steering actuators 8a and 8b in accordance with the tilt direction and the tilt amount of the joystick 23. The controller 10 controls the engines 2a and 2b, the shift actuators 7a and 7b, and the steering actuators 8a and 8b such that translation (linear motion) of the watercraft 100 is made at a velocity corresponding to the tilt amount of the joystick 23 in a direction corresponding to the tilt direction of the joystick 23. Additionally, the controller 10 controls the engines 2a and 2b, the shift actuators 7a and 7b, and the steering actuators 8a and 8b such that the watercraft 100 turns the bow at a velocity corresponding to the twist amount of the joystick 23 in a direction corresponding to the twist direction of the joystick 23.

Processing executed by the controller 10 in accordance with an operation of the joystick 23 will be hereinafter explained in detail. In the following explanation, the term "composite operation" refers to a condition that a bow turning operation and a forward (or rearward) moving operation are both ongoing for the watercraft 100. In other words, the term "composite operation" means that the twist operation about the rotational axis Ax1 and the tilt operation are both ongoing for the joystick 23. On the other hand, the term "sole operation" refers to a condition that only one of the bow turning operation and the forward (or rearward) moving operation is ongoing for the watercraft 100. In other words, the term "sole operation" means that only one of the twist operation about the rotational axis Ax1 and the tilt operation is ongoing for the joystick 23.

The controller 10 determines which of the composite operation and the sole operation is ongoing based on the signal from the joystick 23. The controller 10 determines that the composite operation of bow turning and propulsion is ongoing when receiving both the propulsion signal indicating the tilt operation of the joystick 23 and the bow turning signal indicating the twist operation of the joystick 23. The controller 10 determines that the sole operation of bow turning is ongoing when receiving the bow turning signal without receiving the propulsion signal. The controller 10 determines that the sole operation of propulsion is ongoing when receiving the propulsion signal without receiving the bow turning signal.

Figure 4:
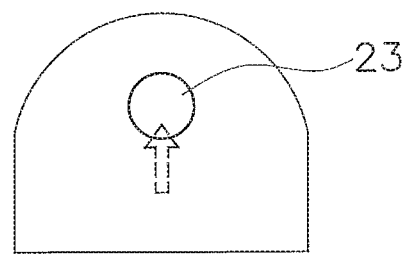
FIG. 4 is a schematic diagram showing control of the outboard motors in a sole operation of forward movement.
Figure 4:
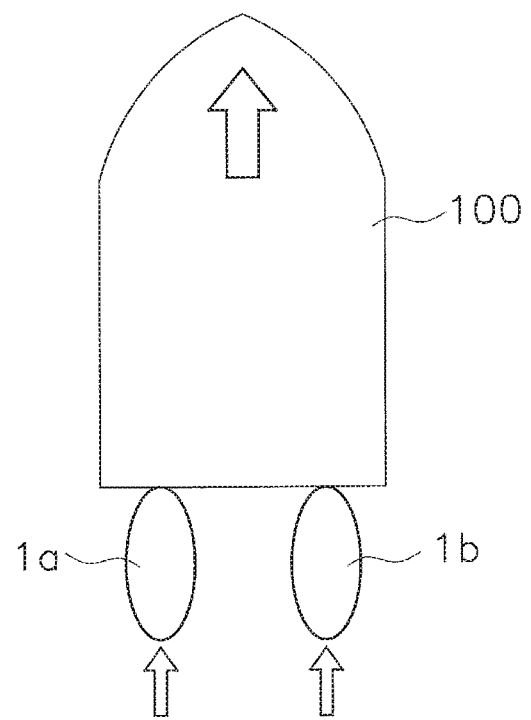

FIG. 4 is a schematic diagram showing control of the outboard motors 1a and 1b in the sole operation of propulsion. In FIG. 4, the joystick 23 is tilted in the forward moving direction. In other words, FIG. 4 shows control of the outboard motors 1a and 1b in the sole operation of forward movement. In this case, the controller 10 controls each of the right and left outboard motors 1b and 1a to generate a thrust in the forward moving direction. The watercraft 100 thus moves forward.

In the sole operation of propulsion, the thrusts generated by the right and left outboard motors 1b and 1a are the same in direction and magnitude. The controller 10 causes each of the right and left outboard motors 1b and 1a to generate a thrust in accordance with the tilt amount of the joystick 23. The rudder angles of the right and left outboard motors 1b and 1a are both 0 degrees. It should be noted that each of the rudder angles of the right and left outboard motors 1b and 1a may be set such that each of the right and left outboard motors 1b and 1a turns to a toe-in or toe-out side from a 0-degree orientation thereof. It should be noted that a rudder angle of 0 degrees means a condition of each of the outboard motors 1a and 1b oriented in parallel with the fore direction of the watercraft 100.

Figure 5:
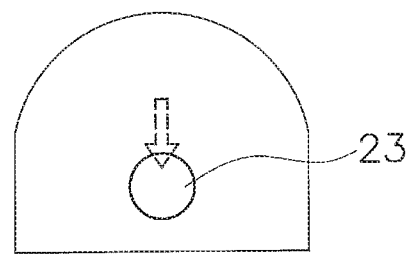
FIG. 5 is a schematic diagram showing control of the outboard motors in a sole operation of rearward movement.
Figure 5:
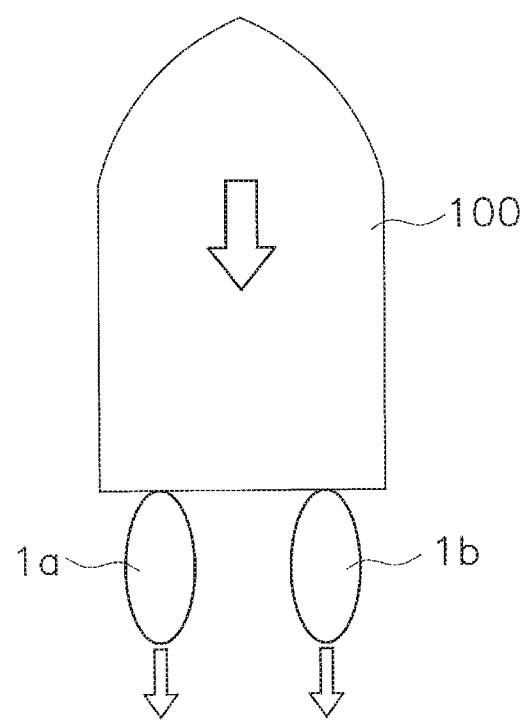

When the joystick 23 is tilted in the rearward moving direction, the controller 10 controls each of the right and left outboard motors 1b and 1a to generate a thrust in the rearward moving direction as shown in FIG. 5. The watercraft 100 thus moves rearward.

Figure 6:
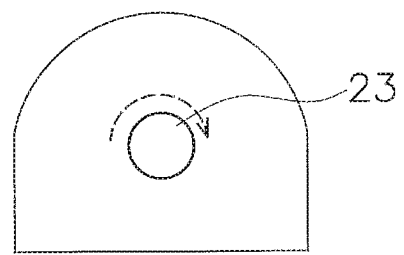
FIG. 6 is a diagram showing control of the outboard motors in a sole operation of rightward bow turning.
Figure 6:
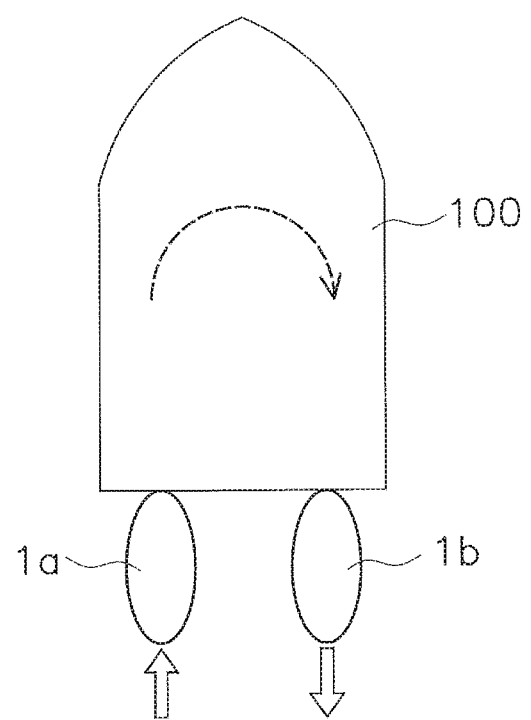

FIG. 6 is a diagram showing control of the outboard motors in the sole operation of bow turning. In the sole operation of bow turning, the controller 10 causes one of the right and left outboard motors 1b and 1a to generate a thrust in the forward moving direction and causes the other of the right and left outboard motors 1b and 1a to generate a thrust in the rearward moving direction in accordance with the bow turning direction indicated by the bow turning signal.

Specifically, the joystick 23 is twisted rightward in FIG. 6. In other words, FIG. 6 shows control of the outboard motors in the sole operation of rightward bow turning. In this case, the controller 10 causes the left outboard motor 1a to generate a forward thrust, and simultaneously, causes the right outboard motor 1b to generate a rearward thrust. The watercraft 100 thus turns the bow rightward.

In the sole operation of bow turning, the thrusts generated by the right and left outboard motors 1b and 1a are preferably the same in magnitude but are opposite in direction. The controller 10 causes each of the right and left outboard motors 1b and 1a to generate a thrust in accordance with the twist amount of the joystick 23. The rudder angles of the right and left outboard motors 1b and 1a are both 0 degrees. It should be noted that each of the rudder angles of the right and left outboard motors 1b and 1a may be set such that each of the right and left outboard motors 1b and 1a turns to a toe-in or toe-out side from the 0-degree orientation thereof.

Figure 7:
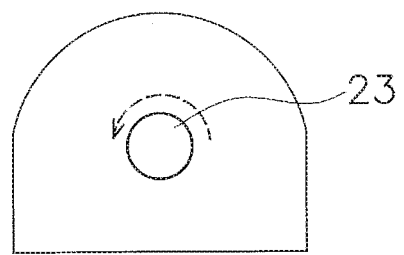
FIG. 7 is a diagram showing control of the outboard motors in a sole operation of leftward bow turning.
Figure 7:
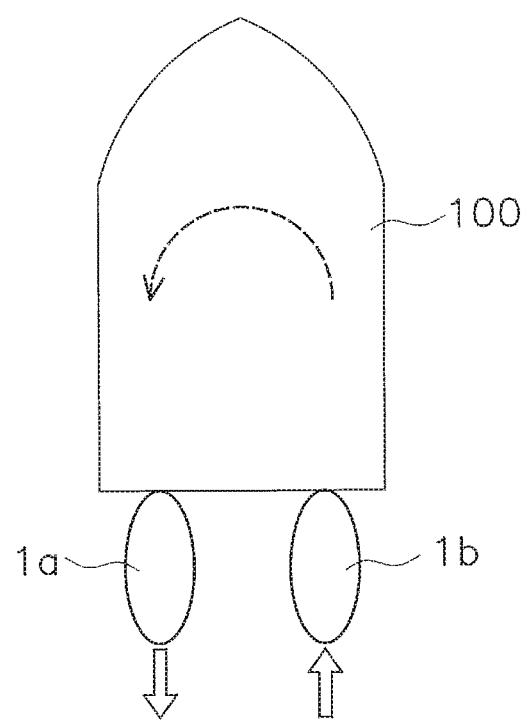

When the joystick 23 is twisted leftward, as shown in FIG. 7, the controller 10 causes the right outboard motor 1b to generate a forward thrust, and simultaneously, causes the left outboard motor 1a to generate a rearward thrust. The watercraft 100 thus turns the bow leftward.

Next, control of the outboard motors 1a and 1b in the composite operation will be explained. In the composite operation, when receiving the propulsion signal after receiving the bow turning signal, the controller 10 controls the right and left outboard motors 1b and 1a and the steering actuators 8a and 8b under a first control. In other words, when the joystick 23 is twisted and is then tilted forward or rearward while being twisted, the controller 10 controls the right and left outboard motors 1b and 1a and the steering actuators 8a and 8b under the first control.

In the composite operation, when receiving the bow turning signal after receiving the propulsion signal, the controller 10 controls the right and left outboard motors 1b and 1a and the steering actuators 8a and 8b under a second control that is different form the first control. In other words, when the joystick 23 is tilted forward or rearward and is then twisted while being tilted, the controller 10 controls the right and left outboard motors 1b and 1a and the steering actuators 8a and 8b under the second control.

Under the first control, the controller 10 controls the right and left outboard motors 1b and 1a so as to cause a difference in direction and/or magnitude between the thrusts generated by the right and left outboard motors 1b and 1a. Under the first control, the controller 10 changes the direction and/or magnitude of the thrust of each of the right and left outboard motors 1b and 1a in accordance with the propulsion signal. Under the first control, the controller 10 maintains each of the rudder angles of the right and left outboard motors 1b and 1a constant.

Figure 8A:
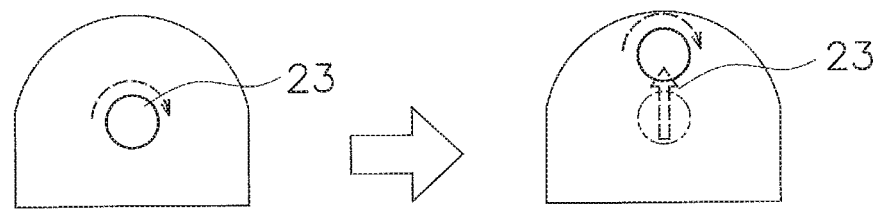
FIGS. 8A and 8B are diagrams showing control of the outboard motors under a first control in a first composite operation.
Figure 8B:
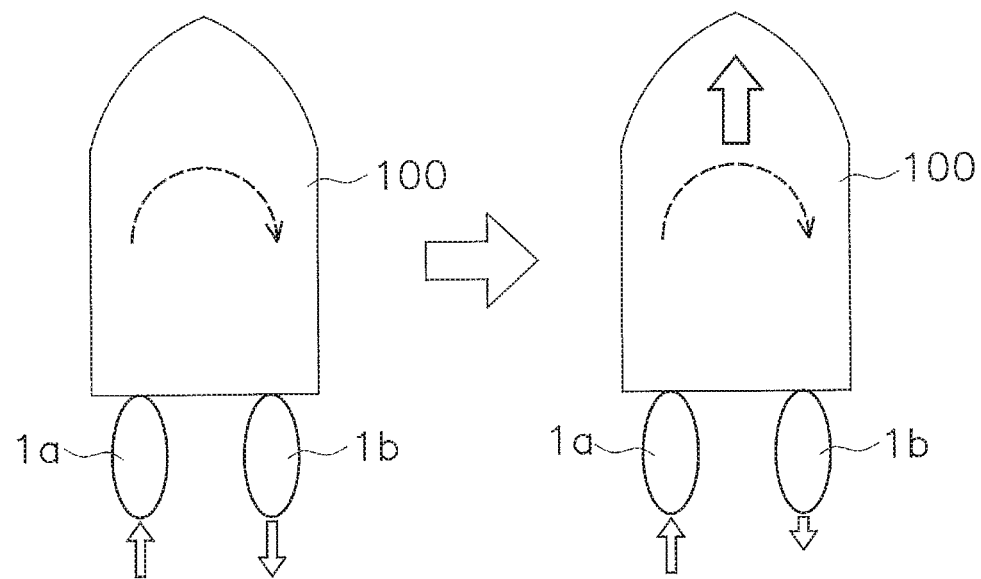

FIGS. 8A and 8B are diagrams showing control of the outboard motors 1a and 1b under the first control in the first composite operation. The first composite operation means that the bow turning direction indicated by the bow turning signal is rightward, while the propulsion direction indicated by the propulsion signal is forward. In other words, the first composite operation means that the rightward twist operation and the forward tilt operation are both ongoing for the joystick 23.

First, in FIG. 8A, the joystick 23 is twisted rightward. In other words, a sole operation of bow turning is ongoing. In this case, similarly in FIG. 6 described above, the controller 10 causes the left outboard motor 1a to generate a forward thrust, and simultaneously, causes the right outboard motor 1b to generate a rearward thrust. The watercraft 100 thus turns the bow rightward.

Next, as shown in FIG. 8B, the joystick 23 is tilted forward while being twisted rightward. In this case, the controller 10 causes the left outboard motor 1a to increase the forward thrust, and simultaneously, causes the right outboard motor 1b to reduce the rearward thrust, in accordance with the tilt amount of the joystick 23. Accordingly, the forward thrust generated by the left outboard motor 1a becomes greater than the rearward thrust generated by the right outboard motor 1b. Therefore, when the operator tilts the joystick 23 forward while twisting the joystick 23 rightward, the watercraft 100 is moved forward while turning the bow rightward.

It should be noted that while the first control is ongoing, the controller 10 maintains each of the rudder angles of the right and left outboard motors 1a and 1b constant. For example, the controller 10 maintains each of the rudder angles of the right and left outboard motors 1b and 1a at 0 degrees. Alternatively, the controller 10 may maintain each of the rudder angles of the right and left outboard motors 1b and 1a at a predetermined angle such that each of the right and left outboard motors 1b and 1a turns to the toe-in or toe-out side.

On the other hand, under the second control, the controller 10 controls the steering actuators 8b and 8a so as to change the rudder angles of the right and left outboard motors 1b and 1a. Under the second control, the controller 10 changes the rudder angles of the right and left outboard motors 1b and 1a in accordance with the bow turning signal. Under the second control, the controller 10 makes the direction and magnitude of the thrust generated by the left outboard motor 1a and those of the thrust generated by the right outboard motor 1b the same as each other.

Figure 9A:
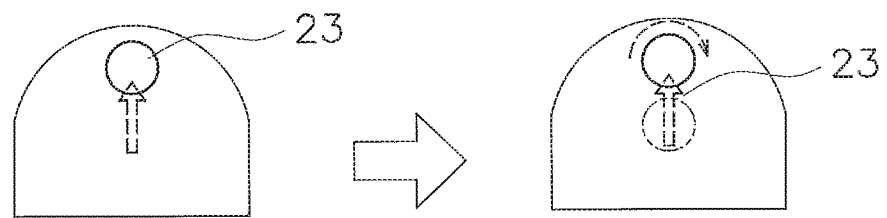
FIGS. 9A and 9B are diagrams showing control of the outboard motors under a second control in the first composite operation.
Figure 9B:
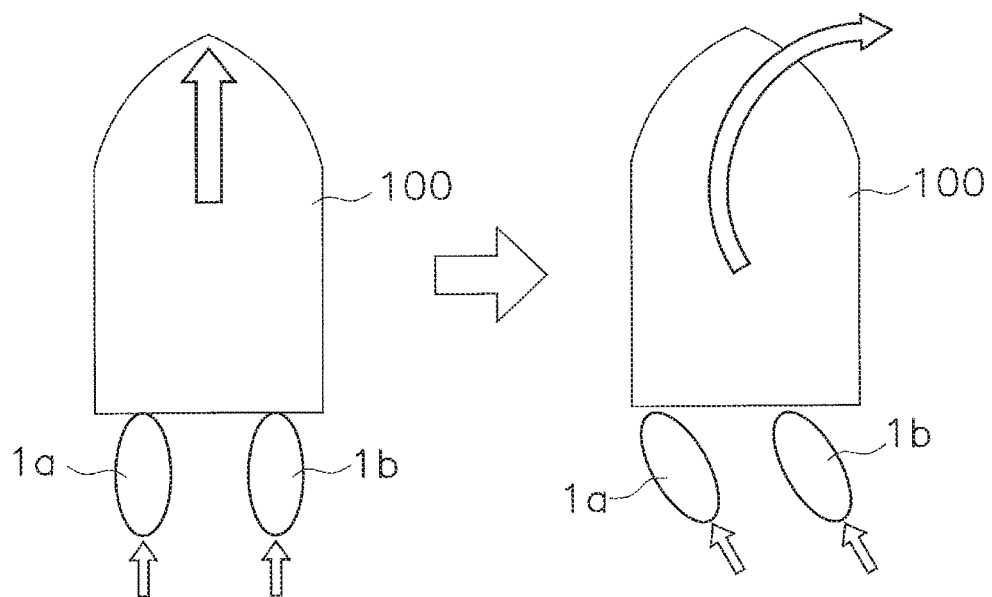

FIGS. 9A and 9B are diagrams showing control of the outboard motors 1a and 1b under the second control in the first composite operation. First, in FIG. 9A, the joystick 23 is tilted forward. In other words, a sole operation of propulsion is ongoing. In this case, similarly in FIG. 4 described above, the controller 10 causes each of the right and left outboard motors 1b and 1a to generate a forward thrust. The watercraft 100 thus moves forward.

Next, as shown in FIG. 9B, the joystick 23 is twisted rightward while being tilted forward. In this case, the controller 10 changes each of the rudder angles of the right and left outboard motors 1b and 1a such that the watercraft 100 turns the bow rightward. The controller 10 changes each of the rudder angles of the right and left outboard motors 1b and 1a in accordance with the twist amount of the joystick 23. The rudder angles of the right and left outboard motors 1b and 1a are the same. The thrusts generated by the right and left outboard motors 1b and 1a are the same in magnitude and are both directed forward. Therefore, when the operator twists the joystick 23 rightward while tilting the joystick 23 forward, the watercraft 100 turns the bow rightward while moving forward.

The control in the first composite operation has been explained above. However, control in each of second to fourth composite operations is similar to that in the first composite operation except for difference in thrust direction and rudder angle. Control in each of the second to fourth composite operations will be hereinafter explained.

Figure 10A:
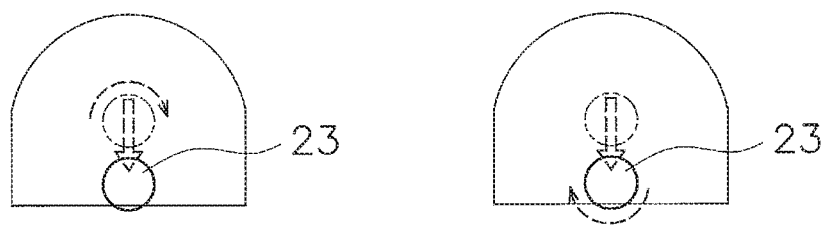
FIGS. 10A and 10B are diagrams showing control of the outboard motors in a second composite operation.

FIG. 10A shows control of the outboard motors 1a and 1b under the first control in the second composite operation. The second composite operation means that the bow turning direction indicated by the bow turning signal is rightward, while the propulsion direction indicated by the propulsion signal is rearward. In other words, the second composite operation means that the rightward twist operation and the rearward tilt operation are both ongoing for the joystick 23.

As shown in FIG. 10A, under the first control in the second composite operation, the controller 10 causes the right outboard motor 1b to generate a rearward thrust, and simultaneously, causes the left outboard motor 1a to generate a forward thrust. Additionally, the controller 10 causes the right outboard motor 1b to increase the rearward thrust, and simultaneously, causes the left outboard motor 1a to reduce the forward thrust, in accordance with the tilt amount of the joystick 23. Accordingly, the rearward thrust generated by the right outboard motor 1b becomes greater than the forward thrust generated by the left outboard motor 1a. Therefore, when the operator tilts the joystick 23 rearward while twisting the joystick 23 rightward, the watercraft 100 moves rearward while turning the bow rightward.

Figure 10B:
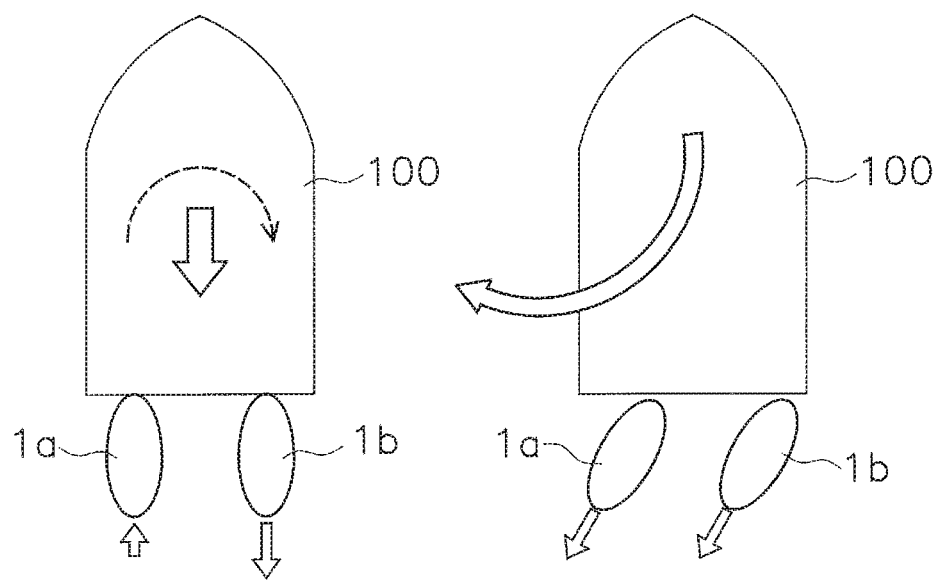

FIG. 10B shows control of the outboard motors 1a and 1b under the second control in the second composite operation. As shown in FIG. 10B, under the second control in the second composite operation, the controller 10 changes each of the rudder angles of the right and left outboard motors 1b and 1a such that the watercraft 100 turns the bow rightward. The controller 10 changes each of the rudder angles of the right and left outboard motors 1b and 1a in accordance with the twist amount of the joystick 23. The rudder angles of the right and left outboard motors 1b and 1a are the same. The thrusts generated by the right and left outboard motors 1b and 1a are the same in magnitude and are both directed rearward. Therefore, when the operator twists the joystick 23 rightward while tilting the joystick 23 rearward, the watercraft 100 turns the bow rightward while moving rearward.

FIG. 11A shows control of the outboard motors 1a and 1b under the first control in the third composite operation. The third composite operation means that the bow turning direction indicated by the bow turning signal is leftward, while the propulsion direction indicated by the propulsion signal is forward. In other words, the third composite operation means that the leftward twist operation and the forward tilt operation are both ongoing for the joystick 23.

As shown in FIG. 11A, under the first control in the third composite operation, the controller 10 causes the right outboard motor 1b to generate a forward thrust, and simultaneously, causes the left outboard motor 1a to generate a rearward thrust. Additionally, the controller 10 causes the right outboard motor 1b to increase the forward thrust, and simultaneously, causes the left outboard motor 1a to reduce the rearward thrust, in accordance with the tilt amount of the joystick 23. Accordingly, the forward thrust generated by the right outboard motor 1b becomes greater than the rearward thrust generated by the left outboard motor 1a. Therefore, when the operator tilts the joystick 23 forward while twisting the joystick 23 leftward, the watercraft 100 moves forward while turning the bow leftward.

FIG. 11B shows control of the outboard motors 1a and 1b under the second control in the third composite operation. As shown in FIG. 11B, under the second control in the third composite operation, the controller 10 changes each of the rudder angles of the right and left outboard motors 1b and 1a such that the watercraft 100 turns the bow leftward. The controller 10 changes each of the rudder angles of the right and left outboard motors 1b and 1a in accordance with the twist amount of the joystick 23. The rudder angles of the right and left outboard motors 1b and 1a are the same. The thrusts generated by the right and left outboard motors 1b and 1a are the same in magnitude and are both directed forward. Therefore, when the operator twists the joystick 23 leftward while tilting the joystick 23 forward, the watercraft 100 turns the bow leftward while moving forward.

FIG. 12A shows control of the outboard motors 1a and 1b under the first control in the fourth composite operation. The fourth composite operation means that the bow turning direction indicated by the bow turning signal is leftward, while the propulsion direction indicated by the propulsion signal is rearward. In other words, the fourth composite operation means that the leftward twist operation and the rearward tilt operation are both ongoing for the joystick 23.

As shown in FIG. 12A, under the first control in the fourth composite operation, the controller 10 causes the left outboard motor 1a to generate a rearward thrust, and simultaneously causes the right outboard motor 1b to generate a forward thrust. Additionally, the controller 10 causes the left outboard motor 1a to increase the rearward thrust, and simultaneously causes the right outboard motor 1b to reduce the forward thrust in accordance with the tilt amount of the joystick 23. Accordingly, the rearward thrust generated by the left outboard motor 1a becomes greater than the forward thrust generated by the right outboard motor 1b. Therefore, when the operator tilts the joystick 23 rearward while twisting the joystick 23 leftward, the watercraft 100 moves rearward while turning the bow leftward.

FIG. 12B shows control of the outboard motors 1a and 1b under the second control in the fourth composite operation. As shown in FIG. 12B, under the second control in the fourth composite operation, the controller 10 changes each of the rudder angles of the right and left outboard motors 1b and 1a such that the watercraft 100 turns the bow leftward. The controller 10 changes each of the rudder angles of the right and left outboard motors 1b and 1a in accordance with the twist amount of the joystick 23. The rudder angles of the right and left outboard motors 1b and 1a are the same. The thrusts generated by the right and left outboard motors 1b and 1a are the same in magnitude and are both directed rearward. Therefore, when the operator twists the joystick 23 leftward while tilting the joystick 23 rearward, the watercraft 100 turns the bow leftward while moving rearward.

Figure 13:
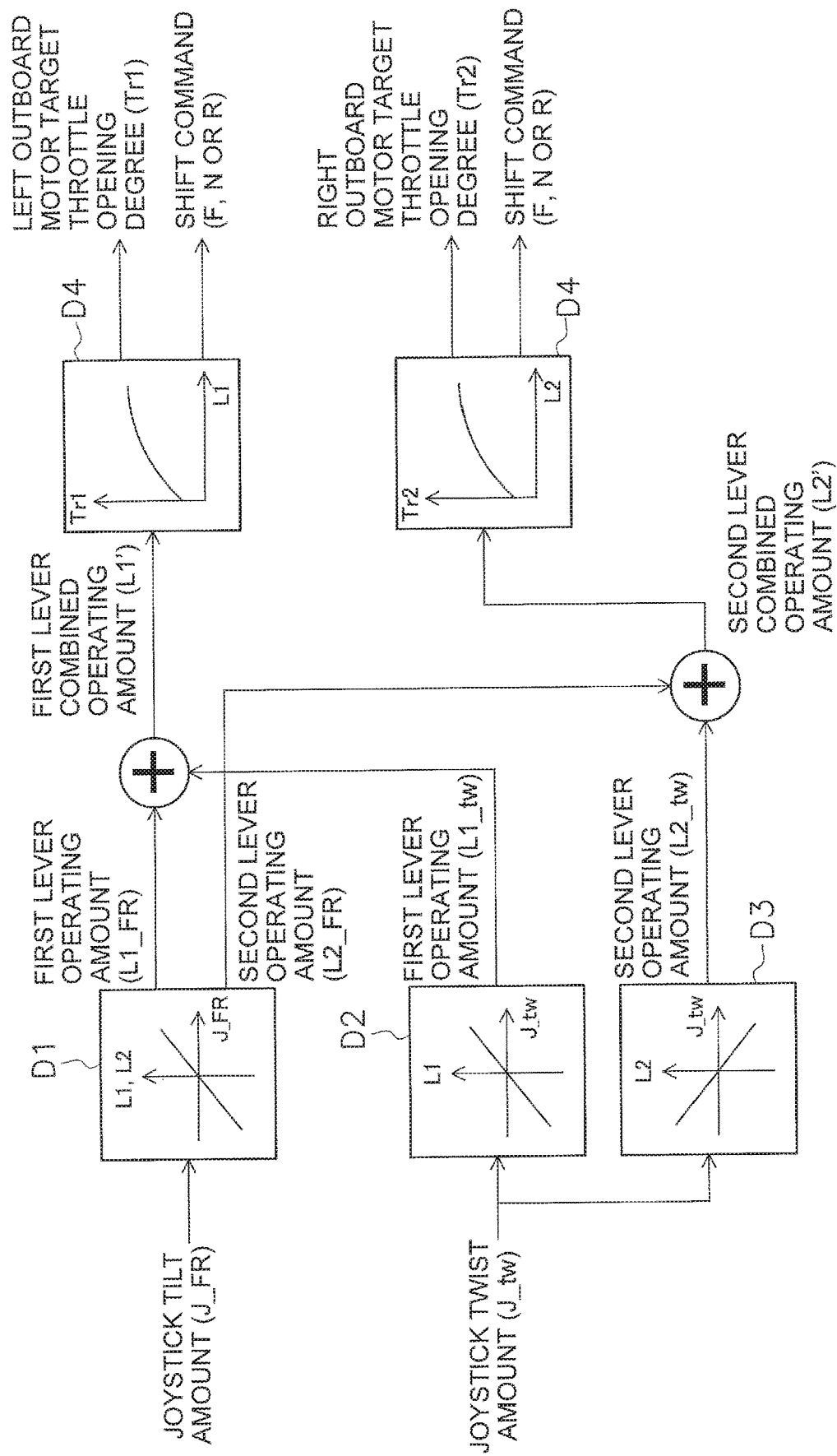
FIG. 13 is a diagram showing processing for determining command values given to engines and shift actuators under the first control.

FIG. 13 is a diagram showing processing used in determining command values given to the engines 2a and 2b and the shift actuators 7a and 7b under the first control. As shown in FIG. 13, the controller 10 stores data D1 to convert a tilt amount J_FR of the joystick 23 into an operating amount L1 of the first lever 22a and an operating amount L2 of the second lever 22b. The controller 10 calculates an operating amount L1_FR by converting the tilt amount J_FR of the joystick 23 into the operating amount of the first lever 22a with reference to the data D1. Additionally, the controller 10 calculates an operating amount L2_FR by converting the tilt amount J_FR of the joystick 23 into the operating amount of the second lever 22b with reference to the data D1.

The controller 10 stores data D2 used in converting a twist amount J_tw of the joystick 23 into the operating amount L1 of the first lever 22a. The controller 10 calculates an operating amount L1_tw by converting the twist amount J_tw of the joystick 23 into the operating amount of the first lever 22a with reference to the data D2.

Additionally, the controller 10 stores data D3 to convert the twist amount J_tw of the joystick 23 into the operating amount L2 of the second lever 22b. The controller 10 calculates an operating amount L2_tw by converting the twist amount J_tw of the joystick 23 into the operating amount of the second lever 22b with reference to the data D3.

In the composite operation, the controller 10 calculates a combined operating amount L1' of the first lever 22a based on the operating amount L1_FR obtained by conversion and the operating amount L1_tw obtained by conversion. For example, the controller 10 calculates the combined operating amount L1' of the first lever 22a in the composite operation by adding the operating amount L1_tw obtained by conversion to the operating amount L1_FR contained by conversion. The controller 10 calculates a combined operating amount L2' of the second lever 22b in the composite operation based on the operating amount L2_FR obtained by conversion and the operating amount L2_tw obtained by conversion. For example, the controller 10 calculates the combined operating amount L2' of the second lever 22b in the composite operation by adding the operating amount L2_tw obtained by conversion to the operating amount L2_FR obtained by conversion.

It should be noted that the methods of calculating the combined operating amounts L1' and L2' are not limited to the above, and may be changed. For example, each of the operating amounts L1_FR and L1_tw obtained by conversion may be multiplied by a predetermined coefficient. Each of the operating amounts L2_FR and L2_tw obtained by conversion may be multiplied by a predetermined coefficient.

The controller 10 stores data D4 defining a relation between the operating amount L1 of the first lever 22a and a target throttle opening degree Tr1 of the engine 2a and a relation between the operating amount L2 of the second lever 22b and a target throttle opening degree Tr2 of the engine 2b. The controller 10 determines the target throttle opening degree Tr1 of the engine 2a based on the combined operating amount L1' with reference to the data D4. The controller 10 determines the target throttle opening degree Tr2 of the engine 2b based on the combined operating amount L2' with reference to the data D4.

Additionally, the controller 10 determines a command given to the shift actuator 7a of the left outboard motor 1a based on the combined operating amount L1'. The controller 10 determines a command given to the shift actuator 7b of the right outboard motor 1b based on the combined operating amount L2'. The controller 10 determines one of commands F (forward movement), N (neutral state), and R (rearward movement) as the command given to each of the shift actuators 7a and 7b in accordance with each of the combined operating amounts L1' and L2'. For example, the controller 10 determines one of the commands F (forward movement), N (neutral state), and R (rearward movement) as the command given to each of the shift actuators 7a and 7b in accordance with the range of a voltage value of a signal indicating each of the combined operating amounts L1' and L2'.

It should be noted that in operating the first lever 22a, the controller 10 determines the target throttle opening degree Tr1 of the engine 2a and the command given to the shift actuator 7a based on the operating amount L1 of the first lever 22a indicated by the signal from the sensor 221 with reference to the data D4. In operating the second lever 22b, the controller 10 determines the target throttle opening degree Tr2 of the engine 2b and the command given to the shift actuator 7b based on the operating amount L2 of the second lever 22b indicated by the signal from the sensor 222 with reference to the data D4.

The controller 10 controls the engine 2a of the left outboard motor 1a based on the target throttle opening degree Tr1. The controller 10 controls the engine 2b of the right outboard motor 1b based on the target throttle opening degree Tr2. The controller 10 controls the shift actuator 7a of the left outboard motor 1a based on the command given to the shift actuator 7a. The controller 10 controls the shift actuator 7b of the right outboard motor 1b based on the command given to the shift actuator 7b.

It should be noted that in the sole operation of propulsion, the operating amounts L1_tw and L2_tw, obtained by converting the twist amount J_tw of the joystick 23, are both "0". Therefore, the controller 10 determines the target throttle opening degrees Tr1 and Tr2 based on the operating amounts L1_FR and L2_FR, obtained by converting the tilt amount J_FR of the joystick 23, with reference to the data D4. In the sole operation of propulsion, the target throttle opening degrees Tr1 and Tr2 become the same. Moreover, in the sole operation of propulsion, the commands given to the shift actuators 7a and 7b become the same.

In the sole operation of bow turning, the operating amounts L1_FR and L2_FR, obtained by converting the tilt amount J_FR of the joystick 23, are both "0". Therefore, the controller 10 determines the target throttle opening degrees Tr1 and Tr2 based on the operating amounts L1_tw and L2_tw obtained by converting the twist amount J_tw of the joystick 23 with reference to the data D4. In the sole operation of bow turning, the target throttle opening degrees Tr1 and Tr2 become the same. Additionally, in the sole operation of bow turning, directions indicated by the commands given to the shift actuators 7a and 7b become opposite to each other.

Figure 14:
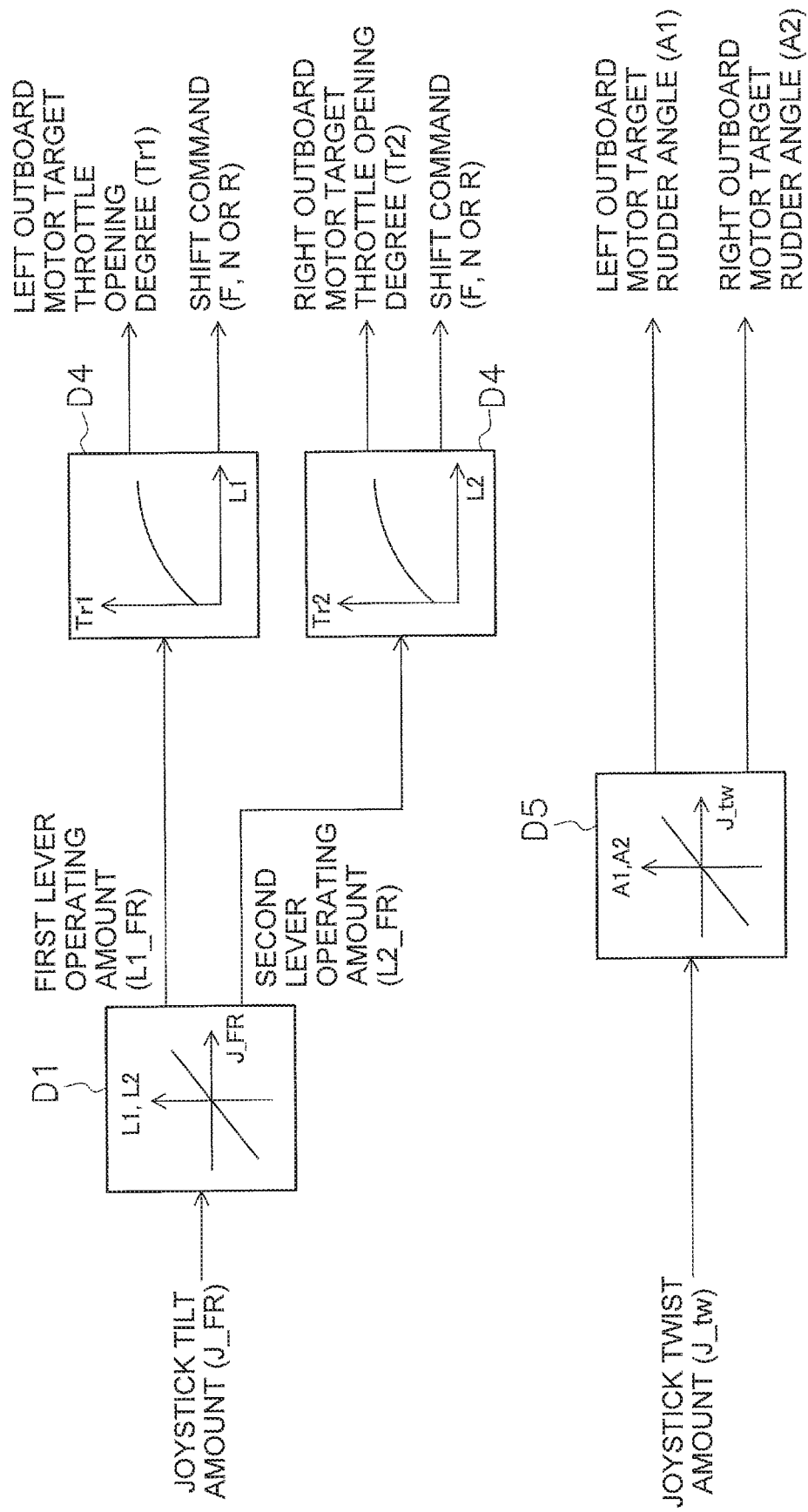
FIG. 14 is a diagram showing processing for determining command values given to the engines, the shift actuators and steering actuators under the second control.

FIG. 14 is a diagram showing processing used in determining command values given to the engines 2a and 2b, the shift actuators 7a and 7b, and the steering actuators 8a and 8b under the second control. As shown in FIG. 14, similarly in the sole operation of propulsion, the controller 10 calculates the operating amount L1_FR of the first lever 22a and the operating amount L2_FR of the second lever 22b by converting the tilt amount J_FR of the joystick 23 with reference to the data D1. Then, the controller 10 determines the target throttle opening degree Tr1 of the engine 2a based on the operating amount L1_FR of the first lever 22a obtained by conversion with reference to the data D4. The controller 10 determines the target throttle opening degree Tr2 of the engine 2b based on the operating amount L2_FR of the second lever 22b obtained by conversion with reference to the data D4.

Additionally, the controller 10 determines the command given to the shift actuator 7a of the left outboard motor 1a based on the operating amount L1_FR of the first lever 22a obtained by conversion. The controller 10 determines the command given to the shift actuator 7b of the right outboard motor 1b based on the operating amount L2_FR of the second lever 22b.

The controller 10 stores data D5 defining a relation between the twist amount J_tw of the joystick 23 and the target rudder angle A1 of the left outboard motor 1a and a relation between the twist amount J_tw of the joystick 23 and the target rudder angle A2 of the right outboard motor 1b under the second control. The controller 10 determines the target rudder angles A2 and A1 of the right and left outboard motors 1b and 1a based on the twist amount J_tw of the joystick 23 with reference to the data D5. The controller 10 controls the steering actuators 8b and 8a such that the actual rudder angles of the right and left outboard motors 1b and 1a become the target rudder angles A2 and A1, respectively. It should be noted that the data D1 to D5 may be made in the form of table, for instance, or alternatively, may be made in another form of mathematical formula or so forth.

In the control systems for the watercraft 100 according to the preferred embodiments of the present invention explained above, when the twist operation of the joystick 23 is performed, and thereafter the tilt operation thereof is performed, the right and left outboard motors 1b and 1a and the steering actuators 8b and 8a are controlled under the first control. Under the first control, each of the rudder angles of the right and left outboard motors 1b and 1a is maintained constant, and the watercraft 100 is moved in the propulsion direction by the thrusts generated by the right and left outboard motors 1b and 1a, while the bow thereof is turned by difference in thrust between the right and left outboard motors 1b and 1a.

Contrarily, when the operation of propelling the watercraft 100 forward or rearward is performed and thereafter the operation of turning the bow of the watercraft 100 is performed, the right and left outboard motors 1b and 1a and the steering actuators 8b and 8a are controlled under the second control. Under the second control, the bow of the watercraft 100 is turned by controlling the rudder angles through the steering actuators 8b and 8a, while the watercraft 100 is moved in the propulsion direction by the thrusts generated by the right and left outboard motors 1b and 1a.

Therefore, compared to the second control, higher priority is placed on bow turning than on forward or rearward movement under the first control. Contrarily, compared to the first control, higher priority is placed on forward or rearward movement than on bow turning under the second control.

Thus, control of the right and left outboard motors 1b and 1a and the steering actuators 8b and 8a are changed in accordance with the order to perform the operation of turning the bow of the watercraft 100 and the operation of propelling the watercraft 100. Accordingly, when the watercraft 100 is propelled while bow turning thereof is ongoing, the watercraft 100 is easily operated in accordance with the state thereof. For example, a short distance adjustment in position of the watercraft 100 can be easily performed under the first control. On the other hand, long distance movement of the watercraft 100 can be easily performed under the second control.

Preferred embodiments of the present invention have been explained above. However, the present invention is not limited to the aforementioned preferred embodiments, and a variety of changes can be made without departing from the gist of the present invention.

For example, the number of outboard motors is not limited to two, and alternatively, may be greater than two. In the aforementioned preferred embodiments, the controller 10 preferably receives the bow turning signal and the propulsion signal from the joystick 23. However, the controller 10 may receive the bow turning signal and the propulsion signal from another type of device. For example, the bow turning signal and the propulsion signal may be outputted from another type of input device operated by the operator such as a switch, a lever, or a touchscreen, for example. Alternatively, the bow turning signal and the propulsion signal may be outputted from the controller to perform automatic control.

In the aforementioned preferred embodiments, under the first control, the operating amount obtained by converting the tilt amount of the joystick 23 and the operating amount obtained by converting the twist amount of the joystick 23 are preferably combined, and the right and left outboard motors 1b and 1a are controlled based on the combined operating amount. However, the right and left outboard motors 1b and 1a may be controlled based on the tilt amount and the twist amount of the joystick 23 without executing the above-described conversions.

In the aforementioned preferred embodiments, under the second control, the right and left outboard motors 1b and 1a are controlled based on the operating amount obtained by converting the tilt amount of the joystick 23 and that obtained by converting the twist amount of the joystick 23. However, the right and left outboard motors 1b and 1a may be controlled based on the tilt amount and the twist amount of the joystick 23 without executing the aforementioned conversions.

Under the first control, the controller 10 may control each of the rudder angles of the steering actuators 8a and 8b. For example, under the first control, when each of the right and left outboard motors 1b and 1a is not in the neutral orientation before the controller 10 receives the operating signal, the controller 10 may actuate the steering actuators 8a and 8b to set each of the rudder angles such that each of the right and left outboard motors 1b and 1a is in the neutral orientation. Alternatively, under the first control, the controller 10 may actuate the steering actuators 8a and 8b to set each of the rudder angles such that each of the right and left outboard motors 1b and 1a slightly turns to a toe-in or toe-out side.

Figure 15C:
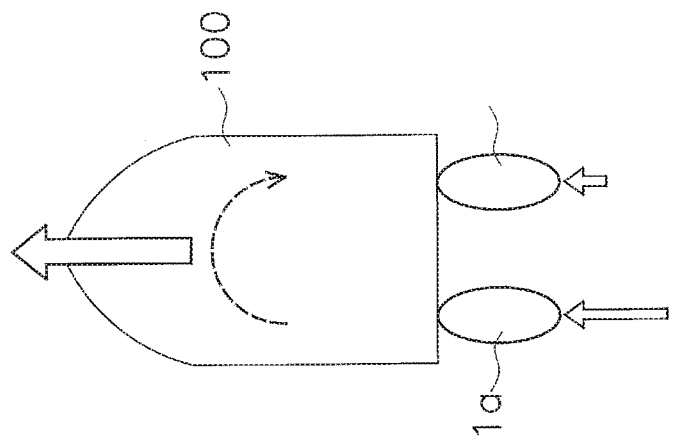
FIGS. 15A to 15C are diagrams showing control of the outboard motors under the first control in a composite operation according to another preferred embodiment of the present invention.
Figure 15B:
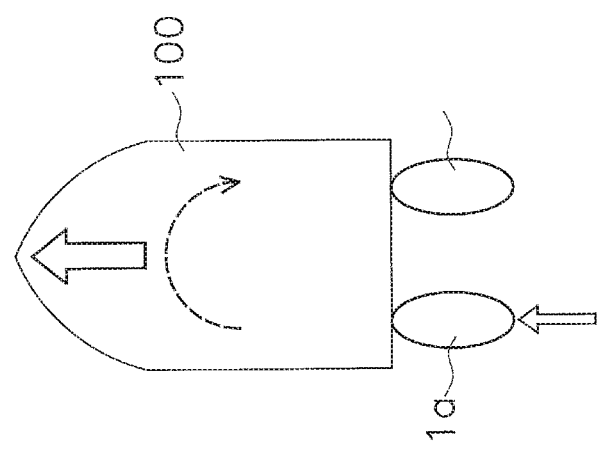
Figure 15A:
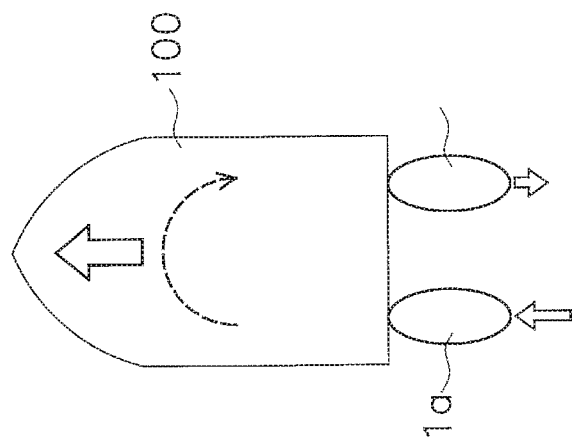

As shown in FIG. 15A, under the aforementioned first control, the controller 10 causes the right and left outboard motors 1b and 1a to generate thrusts in the opposite directions so as to perform bow turning of the watercraft 100. However, the controller 10 may perform bow turning of the watercraft 100 by performing controls different from the aforementioned control. For example, as shown in FIG. 15B, the controller 10 may cause one of the right and left outboard motors 1b and 1a to generate a thrust in the propulsion direction, and simultaneously, maintains the other of the right and left outboard motors 1b and 1a in the neutral state. Alternatively, as shown in FIG. 15C, the controller 10 may cause the right and left outboard motors 1b and 1a to generate thrusts that are the same in direction but are different in magnitude. Further, the controls in FIGS. 15A to 15C may also be switched in accordance with the tilt amount of the joystick 23 in the composite operation.

Under the aforementioned second control, the thrusts generated by the right and left outboard motors 1b and 1a are preferably the same in magnitude. However, under the second control, the thrusts generated by the right and left outboard motors 1b and 1a may be different in magnitude.

Alternatively, under the second control, the thrusts generated by the right and left outboard motors 1b and 1a may be in different directions.

The controller 10 may alternatively determine target rotational speeds Nt1 and Nt2 instead of the aforementioned target throttle opening degrees Tr1 and Tr2, and the controller 10 may control the engine 2a of the left outboard motor 1a based on the target rotational speed Nt1. The controller 10 may control the engine 2b of the right outboard motor 1b based on the target rotational speed Nt2. In this case, as shown in FIGS. 16 and 17, the data D4 may define a relation between the operating amount L1 of the first lever 22a and the target rotational speed Nt1 of the engine 2a and a relation between the operating amount L2 of the second lever 22b and the target rotational speed Nt2 of the engine 2b.

Figure 16:
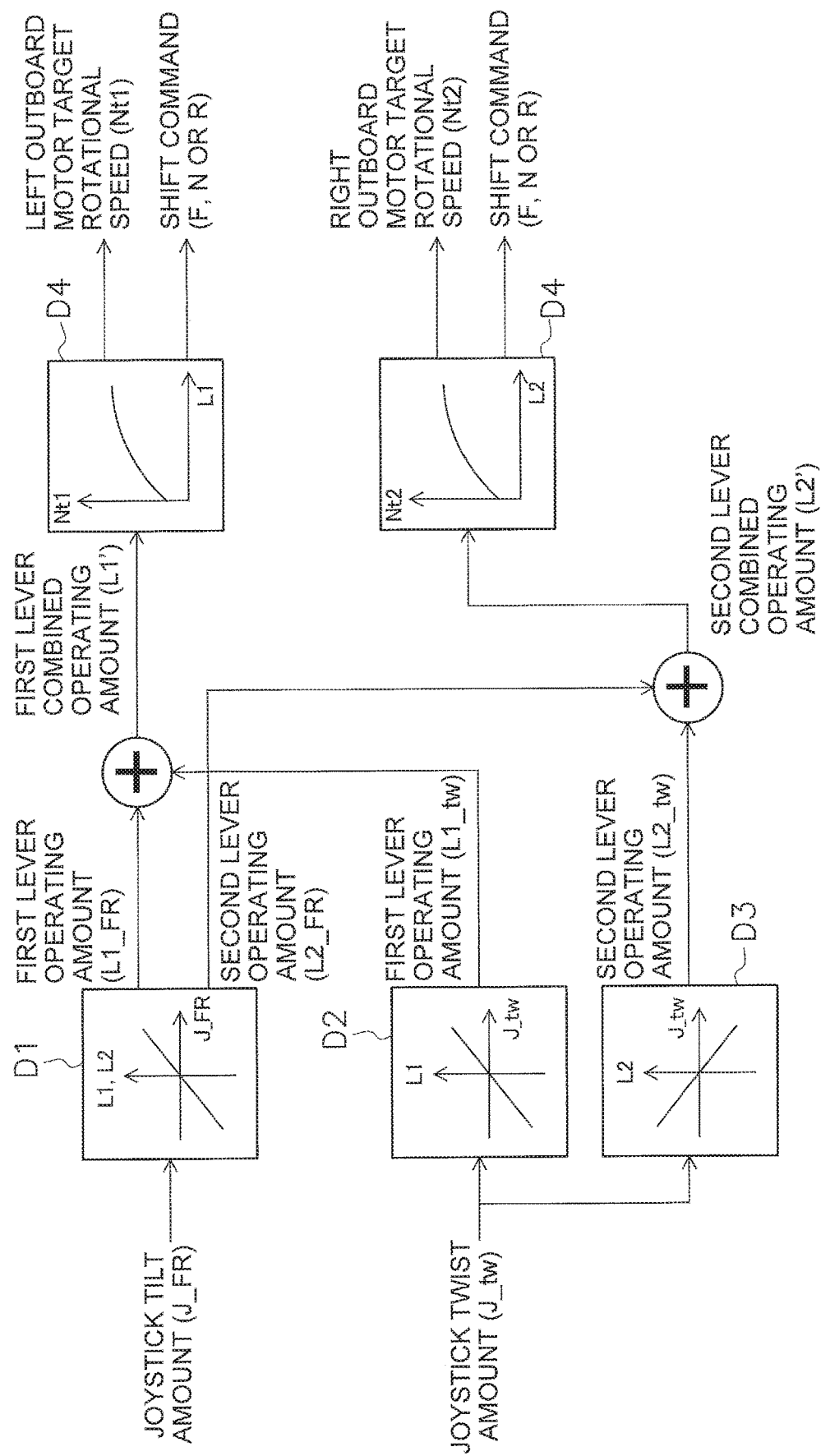
FIG. 16 is a diagram showing another exemplary processing for determining command values provided to the engine and the shift actuators under the first control.

As shown in FIG. 16, under the first control, the controller 10 preferably determines the target rotational speed Nt1 of the engine 2a based on the combined operating amount L1' with reference to the data D4. Under the first control, the controller 10 preferably determines the target rotational speed Nt2 of the engine 2b based on the combined operating amount L2' with reference to the data D4.

Figure 17:
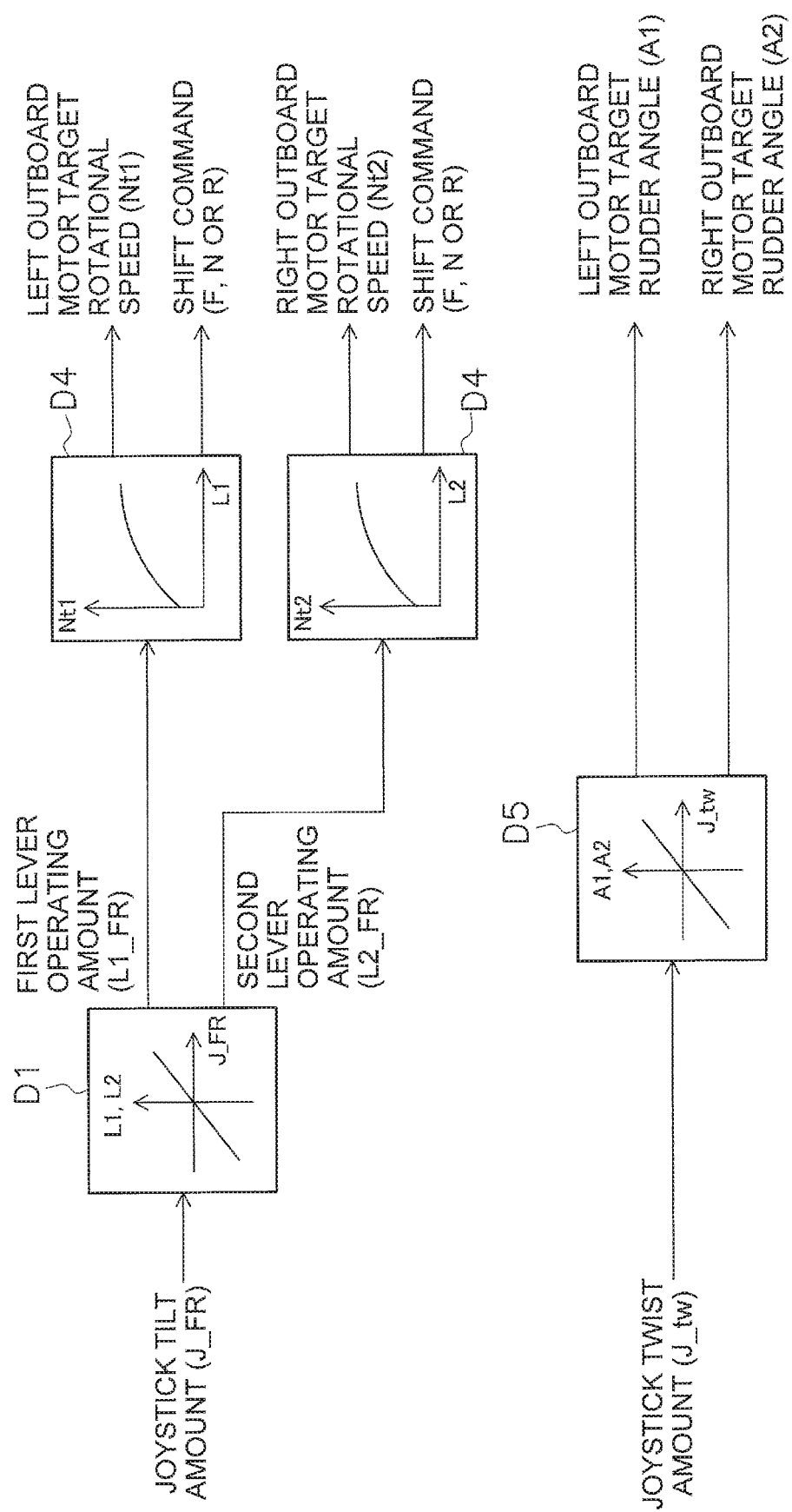
FIG. 17 is a diagram showing another exemplary processing for determining command values given to the engines, the shift actuators and the steering actuators under the second control.

As shown in FIG. 17, under the second control, with reference to the data D4, the controller 10 may determine the target rotational speed Nt1 of the engine 2a based on the operating amount L1_FR of the first lever 22a obtained by conversion. Under the second control, with reference to the data D4, the controller 10 may determine the target rotational speed Nt2 of the engine 2b based on the operating amount L2_FR of the second lever 22b obtained by conversion.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for controlling a watercraft, the system comprising:
   a left outboard motor on a port side of the watercraft;
   a right outboard motor on a starboard side of the watercraft;
   a steering actuator that changes rudder angles of the right and left outboard motors; and
   a controller communicating with the right and left outboard motors and the steering actuator; wherein
   the controller receives a bow turning signal and a propulsion signal, the bow turning signal causing a bow of the watercraft to turn, the propulsion signal causing the watercraft to move forward or rearward;
   the controller controls the right and left outboard motors under a first control when receiving the propulsion signal after receiving the bow turning signal in a composite operation in which the controller receives both the bow turning signal and the propulsion signal; and
   the controller controls the right and left outboard motors and the steering actuator under a second control when receiving the bow turning signal after receiving the propulsion signal in the composite operation, the second control being different from the first control.

2. The system according to claim 1, wherein
   the controller controls the right and left outboard motors under the first control to cause a difference in direction and/or magnitude between thrusts generated by the right and left outboard motors; and
   the controller controls the steering actuator under the second control so as to change the rudder angles of the right and left outboard motors.

3. The system according to claim 2, wherein the controller changes each of the rudder angles of the right and left outboard motors in accordance with the bow turning signal under the second control.

4. The system according to claim 2, wherein the controller maintains each of the rudder angles of the right and left outboard motors constant under the first control.

5. The system according to claim 2, wherein the controller changes each of the thrusts generated by the right and left outboard motors in direction and/or magnitude in accordance with the propulsion signal under the first control.

6. The system according to claim 2, wherein the controller causes the thrusts generated by the right and left outboard motors to be the same in direction and magnitude under the second control.

7. The system according to claim 1, further comprising:
   a joystick that communicates with the controller; wherein
   the joystick outputs the bow turning signal in accordance with a twist operation of the joystick and outputs the propulsion signal in accordance with a tilt operation of the joystick.

8. The system according to claim 7, wherein
   the controller controls the right and left outboard motors and the steering actuator under the first control when the joystick is tilted forward or rearward while being twisted; and
   the controller controls the right and left outboard motors and the steering actuator under the second control when the joystick is twisted while being tilted forward or rearward.

9. A method of controlling a watercraft, the watercraft including a left outboard motor, a right outboard motor, and a steering actuator, the left outboard motor being disposed on a port side of the watercraft, the right outboard motor being disposed on a starboard side of the watercraft, the steering actuator changing rudder angles of the right and left outboard motors, the method comprising:
   receiving a bow turning signal and a propulsion signal, the bow turning signal causing a bow of the watercraft to turn and the propulsion signal causing the watercraft to move forward or rearward;
   controlling the right and left outboard motors under a first control when the propulsion signal is received after the bow turning signal is received in a composite operation in which both the bow turning signal and the propulsion signal are received; and
   controlling the right and left outboard motors and the steering actuator under a second control different from the first control when the bow turning signal is received after the propulsion signal is received in the composite operation.

10. The method according to claim 9, wherein
    the first control includes controlling the right and left outboard motors to cause a difference in direction and/or magnitude between thrusts generated by the right and left outboard motors; and
    the second control includes controlling the steering actuator to change the rudder angles of the right and left outboard motors.

11. The method according to claim 10, wherein the second control includes changing each of the rudder angles of the right and left outboard motors in accordance with the bow turning signal.

12. The method according to claim 10, wherein the first control includes maintaining each of the rudder angles of the right and left outboard motors constant.

13. The method according to claim 10, wherein the first control includes changing each of the thrusts generated by the right and left outboard motors in direction and/or magnitude in accordance with the propulsion signal.

14. The method according to claim 10, wherein the second control includes causing the thrusts generated by the right and left outboard motors to be the same in direction and magnitude.

15. The method according to claim 9, wherein the watercraft further includes a joystick;

the bow turning signal is outputted from the joystick in accordance with a twist operation of the joystick; and the propulsion signal is outputted from the joystick in accordance with a tilt operation of the joystick.

16. The method according to claim 15, wherein the first control includes controlling the right and left outboard motors and the steering actuator when the joystick is tilted forward or rearward while being twisted; and the second control controlling the right and left outboard motors and the steering actuator when the joystick is twisted while being tilted forward or rearward.

* * * * *